United States Patent
Schneider

(10) Patent No.: US 6,345,838 B1
(45) Date of Patent: Feb. 12, 2002

(54) INFLATABLE KNEE BOLSTER COVER

(75) Inventor: David W. Schneider, Waterford, MI (US)

(73) Assignee: Autoliv ASP, Inc., Ogden, UT (US)

(*) Notice: Subject to any disclaimer, the term of this patent is extended or adjusted under 35 U.S.C. 154(b) by 0 days.

(21) Appl. No.: 09/795,742

(22) Filed: Feb. 28, 2001

(51) Int. Cl.[7] .................. B60R 21/22; B60R 21/045
(52) U.S. Cl. .................. 280/730.1; 280/753
(58) Field of Search .................. 280/730.1, 732, 280/751, 752, 753

(56) References Cited

U.S. PATENT DOCUMENTS

| | | |
|---|---|---|
| 5,630,621 A | 5/1997 | Schneider |
| 5,816,613 A | 10/1998 | Specht et al. |
| 5,839,756 A | 11/1998 | Schenck et al. |
| D412,880 S | 8/1999 | Sadr |
| 5,931,493 A * | 8/1999 | Sutherland ............... 280/730.1 |
| 6,131,950 A | 10/2000 | Schroter |
| 6,186,542 B1 | 2/2001 | Enders et al. |

FOREIGN PATENT DOCUMENTS

WO          98/45144     * 10/1998

* cited by examiner

Primary Examiner—Peter C. English
(74) Attorney, Agent, or Firm—Sally J. Brown; James D. Erickson

(57) ABSTRACT

A knee airbag system has a bolster panel that is disposed between an inflatable airbag and a cover. The bolster panel is secured to the cover through the use of one or more fasteners. The bolster panel is configured with one or more trenches or wells that provide recess spaces. The fasteners extend from the cover and pass through the bolster panel and into a recess space provided by the trench or well. The recess space has a depth that is greater than the protruding portion of the fastener to prevent the fastener from contacting the airbag. In order to prevent a portion of the airbag from entering a recess space, the airbag is secured to the bolster panel so as to limit slack.

20 Claims, 3 Drawing Sheets

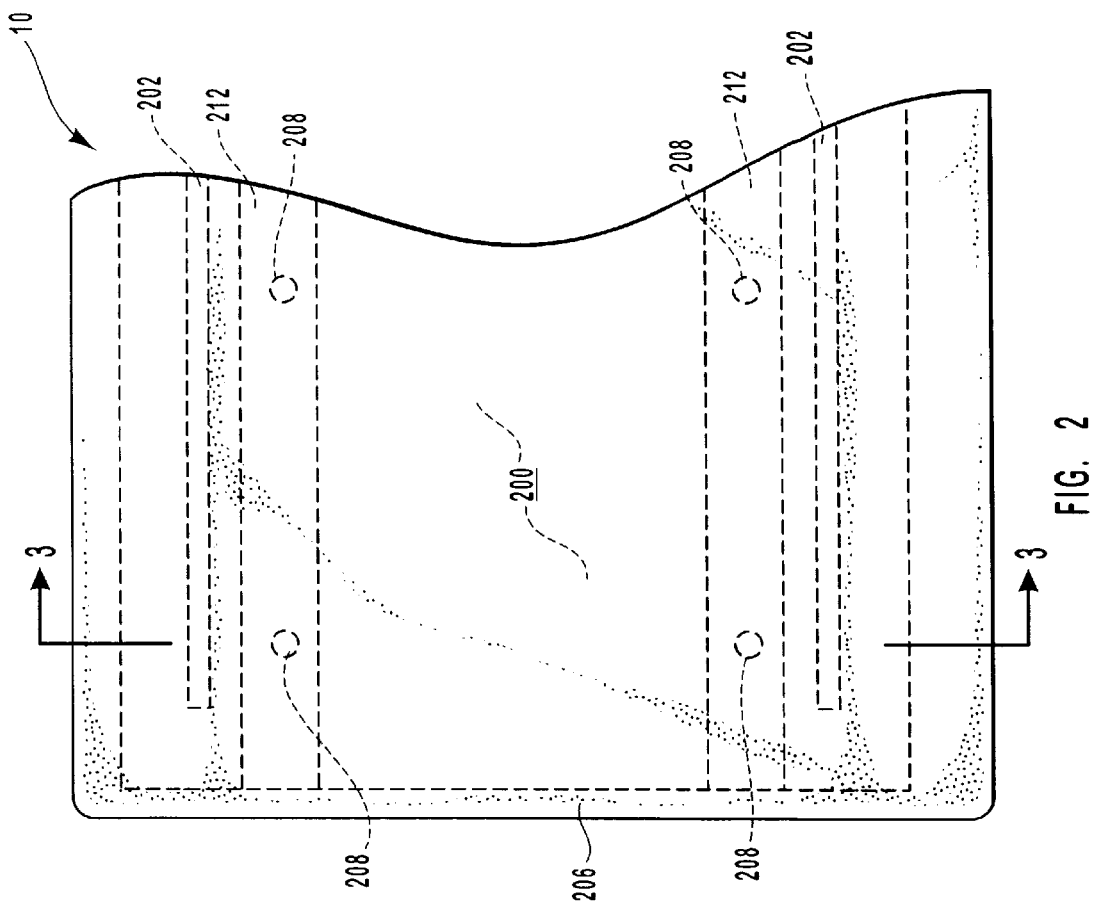
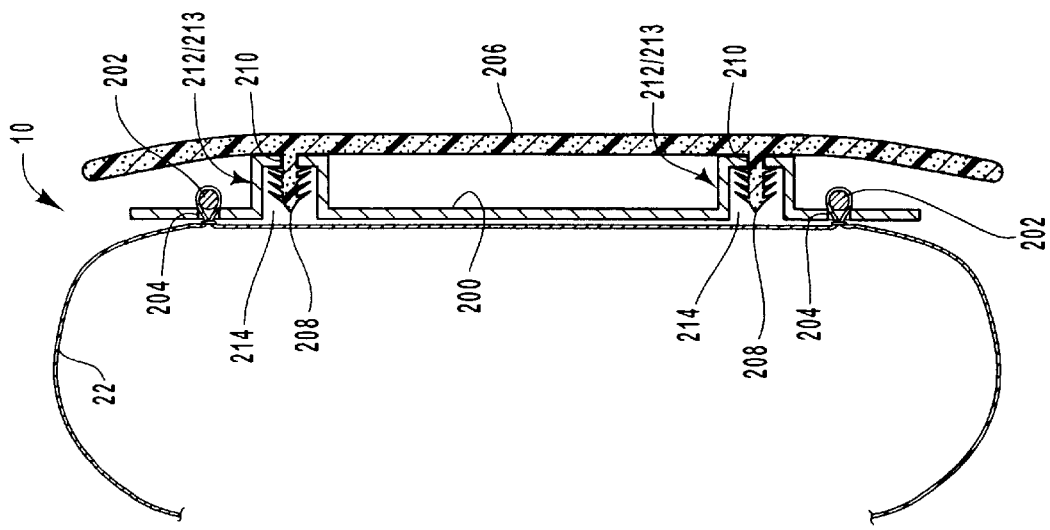

INFLATABLE KNEE BOLSTER COVER

BACKGROUND OF THE INVENTION

1. Field of the Invention

The present invention relates to airbag inflation apparatuses for use in motor vehicles and, more specifically, to a cover of a bolster panel for a knee airbag system.

2. Technical Background

Inflatable airbags are well accepted in their use in motor vehicles and have been attributed with preventing numerous deaths in accidents. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

A modern airbag apparatus may include an electronic control unit (ECU) and one or more airbag modules. The ECU is usually installed in the middle of an automobile, between the passenger and engine compartment. If the vehicle has a driver bag only, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag to impact a passenger and prevent injury to the passenger. In some airbag apparatuses, the airbag may be fully inflated within 50 thousandths of a second and deflated within two tenths of a second.

An airbag cover covers a compartment containing the airbag module and may reside on a steering wheel, dashboard, vehicle door, or vehicle wall. The airbag cover is typically made of a rigid plastic and may be forced opened by the pressure from the deploying airbag. In deploying the airbag, it is preferable to retain the airbag cover to prevent the airbag cover from flying loose in the passenger compartment. If the airbag cover freely moves into the passenger compartment, it may injure a passenger.

Airbag apparatuses have been primarily designed for deployment in front of the torso of an occupant. More specifically, airbags are disposed for deployment between the upper torso of an occupant and the windshield and instrument panel. During a front end collision, there is a tendency for an occupant, particularly one who is not properly restrained by a seat belt, to slide forward along the seat and "submarine" under the airbag (hereinafter referenced as the "primary airbag").

In order to prevent such an occurrence, a knee airbag system has been developed to engage an occupant's knees or lower legs and prevent submarining under the primary airbag. The knee airbag system includes a knee airbag which deploys during an accident to restrain forward movement of an occupant's knees and legs. The knee airbag system may also include a fixed panel, referred to as a knee bolster panel, which is disposed in front of a knee airbag. The knee bolster panel provides a more rigid surface area than an airbag alone to better engage the knees or lower legs of an occupant to thereby restrain the occupant's lower body. The knee bolster panel may provide some degree of deformation to minimize the impact to an occupant.

Knee airbag systems are located in the lower portion of an instrument panel. The system further includes a cover which is attached to the bolster panel and generally conforms to the contour of an exterior surface of the instrument panel. The cover may attach to the bolster panel through use of fasteners such as rivets, clips, or other snap-fit devices. The fasteners may be molded into the cover or may be separate components. In conventional systems the fasteners extend from the cover and through the bolster panel to the extent that they may contact the airbag. As the fasteners are sharped edged devices, they may puncture or otherwise tear the airbag. The airbag is particularly susceptible to punctures from the fasteners when the fasteners are initially driven through the bolster panel. Obviously, a torn airbag will not inflate properly and provide the full intended cushion effect.

It would therefore be an advancement in the art to provide a knee airbag system which prevents contact between the fasteners and the airbag to avoid tearing. It would be a further advancement in the art to provide a simple and economical solution to prevent contact between the fasteners and the airbag. Such a device disclosed and claimed herein.

BRIEF SUMMARY OF THE INVENTION

The present invention is a knee airbag system with a bolster panel that is disposed between an inflatable airbag and a cover. The bolster panel is secured to the cover through the use of one or more fasteners. The bolster panel is configured with one or more trenches or wells that provide recess spaces. The fasteners extend from the cover and pass through the bolster panel and into a recess space provided by the trench or well. The recess space has a depth that is greater than the protruding portion of the fastener to prevent the fastener from contacting the airbag. The airbag may be secured to bolster panel by passing a portion of the airbag through a retention aperture in the bolster panel. The portion of the airbag then passes around a retention rod that has a diameter greater than the retention aperture. In order to prevent a portion of the airbag from entering a recess space, the airbag is secured to the bolster panel so as to limit slack. The present invention provides a cost effective and practical solution to reduce risks of airbag tears while still retaining the use of fasteners.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings only provide selected embodiments of the invention and are not therefore to be considered limiting of the scope, the invention will be described and explained with additional specificity and detail through the use of the accompanying drawings in which:

FIG. 2 is a plan view of one embodiment of the cover and bolster panel of the knee airbag system;

FIG. 3 is a cross sectional view of the knee airbag system of FIG. 2 taken across line 3—3;

DETAILED DESCRIPTION OF THE INVENTION

A preferred embodiment of the invention is now described with reference to the FIGS. 1–5, where like reference numbers indicate identical or functionally similar elements. The members of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Figure 1:
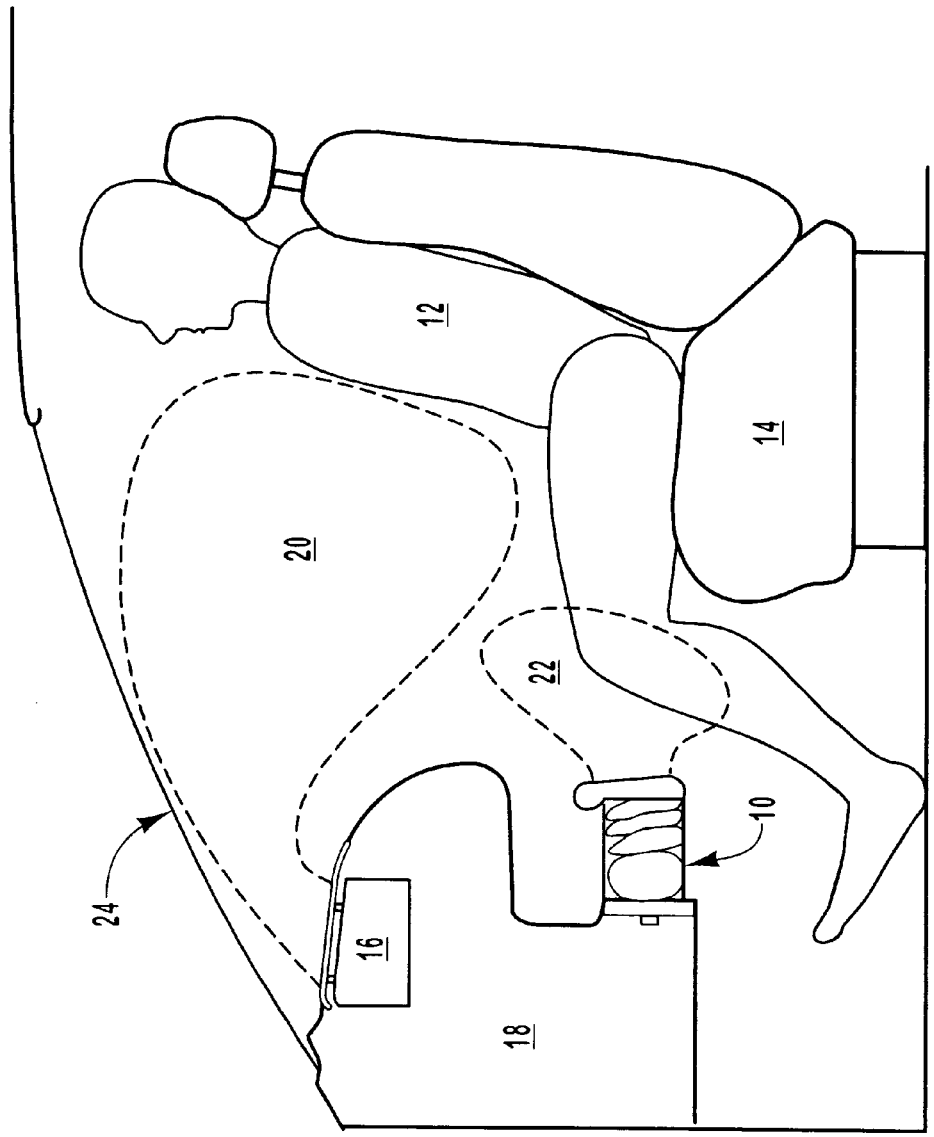
FIG. 1 is a cross sectional view of the passenger compartment of an automobile, wherein the automobile includes primary and knee airbag systems.

Referring to FIG. 1, one embodiment of a knee airbag system 10 that may be used with the present invention is shown. The knee airbag system 10 is shown relative to an occupant 12 seated in a front seat 14 in an automobile. The knee airbag system 10 may be used in combination with a primary airbag system 16 mounted in an upper portion of an instrument panel 18. The primary airbag system 16 is disposed to deploy in front of an occupant's torso. The knee airbag system 10 may be mounted to the lower portion of the instrument panel 18 in front of the occupants knees and lower legs. One of skill in the art will appreciate that the knee airbag system 10 may be disposed in various locations, all of which are included within the scope of the invention.

Upon receipt of an activation signal transmitted from a crash sensor mounted elsewhere on the automobile, the primary airbag system 16 and the knee airbag system 10 inflate their respective airbags 20, 22 (shown in dotted lines) into the inflated positions. In the inflated position, the primary airbag 20 restrains the occupant's upper torso from being propelled forward into the windshield 24 and the upper portion of the instrument panel 18. When this occurs, there is a tendency for the lower portion of the occupant's body to be propelled forward and under the primary airbag 20 which is referred to as submarining. This tendency is pronounced when the occupant 12 is not restrained by a seat belt, or if the seat belt is not properly tensioned over the occupant's lap. To compensate for submarining, the knee airbag 22 deploys and expands into an inflated position to hold the knees and lower legs from sliding forward. This causes the lower portion of the occupant's body to resist submarining.

Referring to FIGS. 2 and 3, a plan view and a cross-sectional view of one embodiment of a knee airbag system 10 of the present invention is shown. The system 10 may include a bolster panel 200 which is disposed on the exterior surface of the knee airbag 22 such that the knee airbag 22 is in front of the occupant's knees and lower legs. Upon deployment, the bolster panel 200 provides a rigid surface area to engage the occupant to thereby restrain submarining of the occupant's lower body.

The bolster panel 200 is secured to the knee airbag 22. In one embodiment, this is accomplished through one or more retention rods 202 that laterally traverse the bolster panel 200. The retention rods 202 are disposed adjacent retention apertures 204. The retention rods 202 are configured with diameters greater than the cross sectional area of a retention aperture 204. A portion of the knee airbag 22 extends through a retention aperture 204 and around a retention rod 202. In this manner, the bolster panel 200 may be secured to the knee airbag 22. In alternative embodiments, the bolster panel 200 may be attached to the airbag 22 through use of adhesives, clips, stitches, and so forth.

The knee airbag system 10 may further include a panel member or cover 206 that is secured to the exterior of the bolster panel 200 such that it is deployed in front of an occupant's knees and lower legs. The panel member 206 may be configured to conform to the contour of the exterior surface of the instrument panel 18 illustrated in FIG. 1. The panel member 206 may be secured to the bolster panel 200 through the use of one or more fasteners 208. The fasteners 208 may include rivets, screws, clips, or other snap-fit devices. Thus, the fasteners 208 may be embodied as members that extend from the panel member 206 and into the bolster panel 200. The fasteners 208 may be separate components, or, as embodied in FIG. 3, may be integrated into the panel member 206. The fasteners 208 are distributed so as to ensure uniform adhesion between the bolster panel 200 and the panel member 206.

The fasteners 208 are typically embodied with sharp edges or points to better engage the bolster panel 200. The fasteners 208 may puncture the bolster panel 200 during installation. Alternatively, the bolster panel 200 may be configured with receiving apertures 210 to receive and retain the fasteners 208.

As shown in FIG. 3, the fasteners 208 may extend through the bolster panel 200 and protrude outward towards the airbag 22. In order to prevent contact between the fasteners 208 and the airbag 22, the bolster panel 200 may be configured with one or more recesses or depressions 212. The recesses 212 may be embodied in various ways to provide an indentation in the generally planar configuration of the bolster panel 200. The recesses 212 define a recess space 214 for one or more protruding fasteners 208.

As shown in FIGS. 2 and 3, the recesses 212 may be embodied as trenches 213. The trenches 213 are configured to provide a recess space 214 with a depth greater than the protruding portion of a fastener. A plurality of fasteners 208 may be so disposed linearly within a trench 213.

One of skill in the art will appreciate that the trenches 213 may be embodied in various configurations and such configurations would be included within the scope of the invention. In one embodiment, the trenches 213 may extend laterally across the bolster panel 200. The trenches 213 may also extend completely or partially across the bolster panel 200. The length of the trenches 213 may depend on the number and distribution of the fasteners 208. The trenches 213 may have rectangular shapes, as shown in FIG. 3, or may have curvilinear shapes.

The airbag 22 is fastened against the bolster panel 200 to substantially limit the slack in the airbag 22 adjacent the bolster panel 200. The lack of slack prevents a portion of the airbag 22 from entering a recess space 214 and contacting a fastener 208. As mentioned previously, the airbag 22 may be attached to the bolster panel 200 in various ways.

Figures 4, 5:
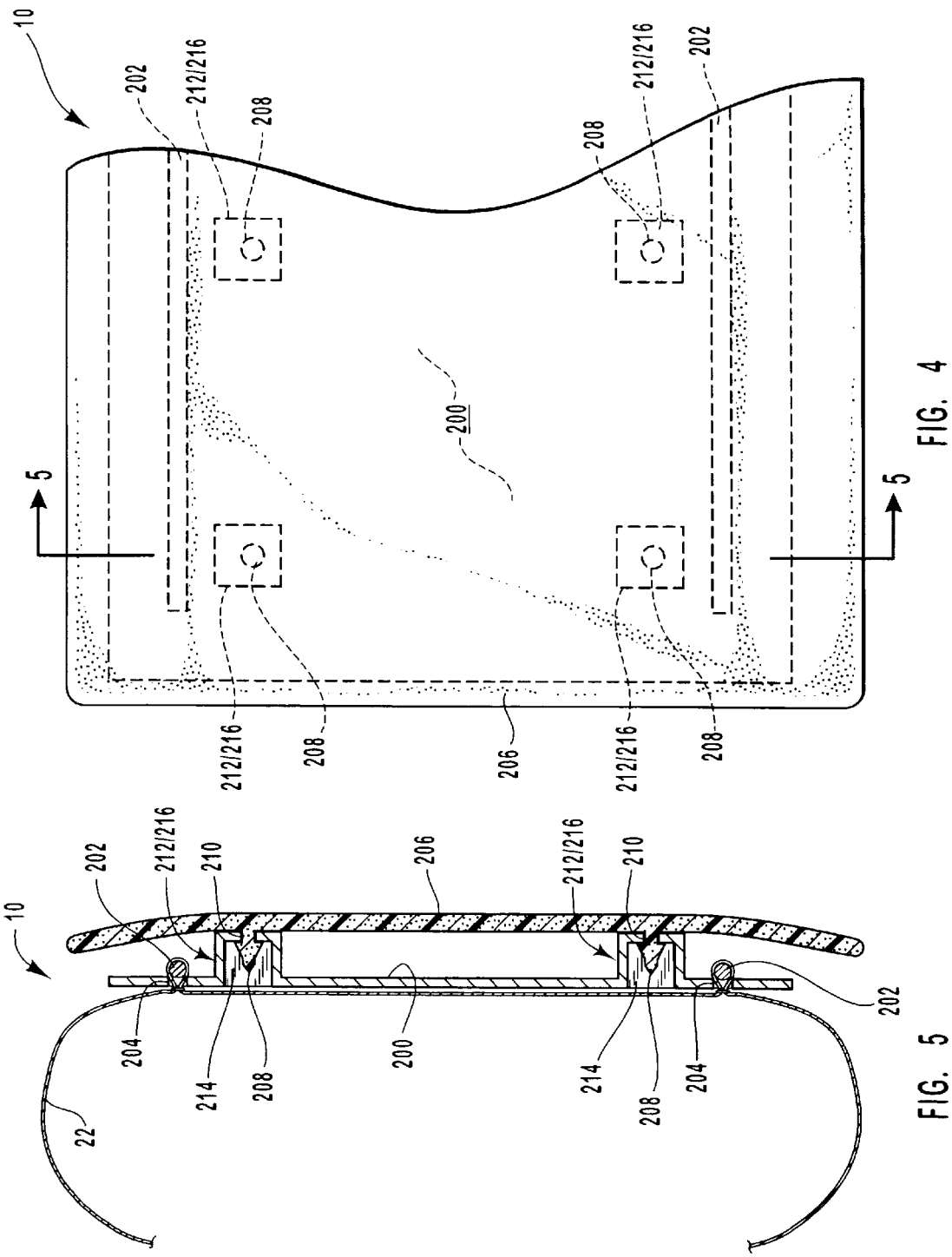
FIG. 4 is a plan view of an alternative embodiment of the cover and bolster panel of the knee airbag system.
FIG. 5 is a cross sectional view of the knee airbag system of FIG. 4 taken across line 5—5.

Referring to FIGS. 4 and 5, a plan view and a cross-sectional view of an alternative embodiment of a knee airbag system 10 of the present invention is shown. The embodiment of FIGS. 4 and 5 differs from that of FIGS. 2 and 3 in that the recesses 212 are not configured as trenches 213 but as wells 216. The wells 216 provide recess spaces 214 in a manner similar to that of the trenches 213.

The wells 216 may be distributed throughout the bolster panel 200 to provide a corresponding recess space 214 for each fastener 208. The wells 216 may be configured in a variety of shapes including rectangular or circular shapes. The wells 216 are configured with depths greater than the protruding portions of the fasteners 208. The wells 216 may be disposed in-line with one another, as shown in FIGS. 4 and 5, or may be disposed otherwise. In one embodiment, the wells 216 may be disposed in two parallel rows that extend laterally across the bolster panel 200. Each well 216 may further accommodate a single fastener 208 or a plurality of fasteners 208.

As in the embodiments of FIGS. 2 and 3, the airbag 22 is fastened against the bolster panel 200 to substantially limit the slack in the airbag 22 adjacent the bolster panel 200. Limiting slack prevents a portion of the airbag 22 from entering a recess space 214 and contacting a fastener 208.

Although the present invention has been generally directed to knee airbag systems, one of skill in the art will appreciate that present invention is applicable to any airbag system employing a bolster panel 200. The present invention provides a bolster panel 200 configured with a recess space 214 for each fastener 208 to thereby prevent contact between an airbag 22 and a fastener 208. Configuration of a bolster panel 200 in this manner is an economical and effective solution.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. An airbag system for restraining an occupant during inflation, comprising:
    an inflatable airbag;
    a bolster panel attached to the airbag;
    a panel member; and
    a fastener attached to the panel member and extending through the bolster panel to secure the panel member to the bolster panel,
    wherein the bolster panel is configured with a recess into which the fastener protrudes, the recess defining a recess space having a depth greater than the length of a protruding portion of the fastener.

2. The airbag system of claim 1, wherein the fastener is integrated with the panel member.

3. The airbag system of claim 1, wherein the recess comprises a first trench.

4. The airbag system of claim 3, wherein the trench extends laterally across the bolster panel.

5. The airbag system of claim 3, wherein the trench is rectangular.

6. The airbag system of claim 3, further comprising a second fastener attached to the panel member and extending through the bolster panel, and wherein the bolster panel is configured with a second trench into which the second fastener protrudes, the second trench providing a recess space having a depth greater than the length of a protruding portion of the second fastener.

7. The airbag system of claim 6, wherein the second trench is disposed parallel to the first trench.

8. The airbag system of claim 1, further comprising a retention rod, wherein the bolster panel further includes a retention aperture, the airbag passing through the retention aperture and engaging the retention rod.

9. The airbag system of claim 1, wherein the bolster panel attaches to the airbag to substantially limit slack in a portion of the airbag adjacent the bolster panel.

10. The airbag system of claim 1, wherein the recess comprises a well.

11. The airbag system of claim 10, wherein the well is rectangular.

12. An airbag system for restraining an occupant during inflation, comprising:
    an inflatable airbag;
    a bolster panel attached to the airbag;
    a panel member; and
    a plurality of fasteners attached to the panel member and extending through the bolster panel,
    wherein the bolster panel is configured with a plurality of recesses into which the fasteners protrude, the recesses providing recess spaces having a depth greater than the length of a protruding portion of the fasteners.

13. The airbag system of claim 12, wherein the recesses comprise trenches.

14. The airbag system of claim 13, wherein the trenches are disposed parallel to one another.

15. The airbag system of claim 12, wherein the recesses comprise wells.

16. The airbag system of claim 15, wherein the wells are disposed in two parallel rows that extend laterally across the bolster panel.

17. The airbag system of claim 12, wherein the fasteners are integrated with the panel member.

18. The airbag system of claim 12, further comprising a retention rod, wherein the bolster panel further includes a retention aperture, the airbag passing through the retention aperture and engaging the retention rod.

19. The airbag system of claim 12, wherein the bolster panel attaches to the airbag to substantially limit slack in a portion of the airbag adjacent the bolster panel.

20. An airbag system for restraining an occupant during inflation, comprising:
    an inflatable airbag;
    a bolster panel attached to the airbag and configured with two trenches, each trench defining a recess space;
    a panel member; and
    a plurality of fasteners attached to the panel member and extending through the bolster panel, such that a portion of each fastener protrudes into one of the recess spaces, the protruding portion of each fastener having a length less than the depth of the respective recess space.

* * * * *